A. WATSON.
Mole Plow.
No. 22,906.　　　　　　　　　　　　　　　Patented Feb. 8, 1859.
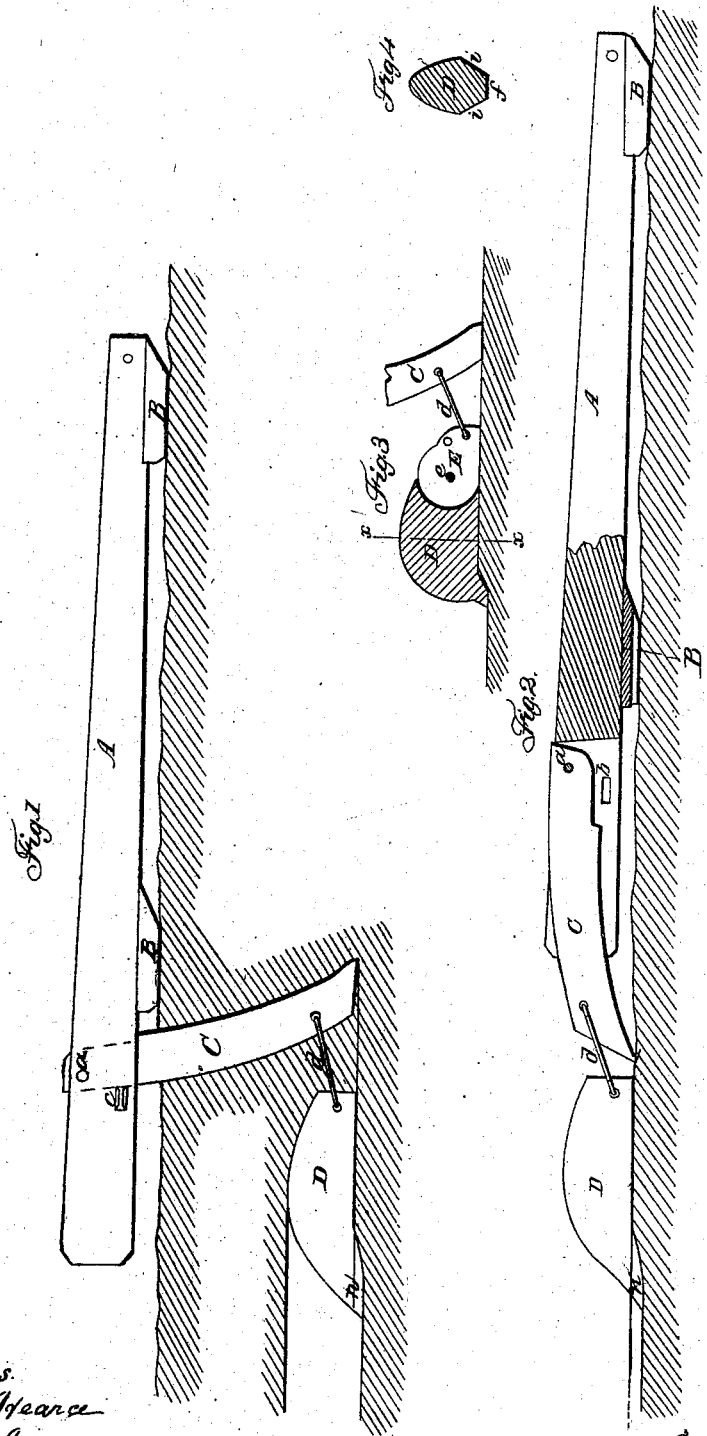
Witnesses.
Thomas Hearne
John Jones
Inventor.
Augustus Watson

UNITED STATES PATENT OFFICE.

AUGUSTUS WATSON, OF WALNUT RUN, OHIO.

IMPROVEMENT IN UNDERGROUND-DRAIN PLOWS.

Specification forming part of Letters Patent No. 22,906, dated February 8, 1859.

*To all whom it may concern:*

Be it known that I, AUGUSTUS WATSON, of Walnut Run, in the county of Madison and State of Ohio, have invented certain new and useful Improvements in Underground-Drain Plows; and I do hereby declare the following to be a full, clear, and exact description of the construction and operation of the same, reference being had to the accompanying drawings, making a part of this specification, in which—

Figure 1 represents a side view of the plow as it appears when forming the ditch. Fig. 2 represents the plow as it appears when the mole is withdrawn from the ground. Fig. 3 represents a longitudinal vertical section through the mole; and Fig. 4 represents a vertical cross-section through the mole, taken at the red line *x x* of Fig. 3.

Similar letters of reference, where they occur in the several figures, denote like parts of the apparatus in all the figures.

To enable others skilled in the art to make and use my invention, I will proceed to describe the same with reference to the drawings.

A represents a beam, to the front end of which the force or power that is to draw the plow is applied. This beam may be supported on pairs or sets of runners B B; or it may be mounted on or supported by wheels or trucks, if so preferred. The rear end of the beam is slotted or mortised, so as to receive in said slot or mortise a colter, C, which is secured to the beam by a bolt or pin, *a*, on which it may hinge or swing, and behind the colter, as seen in Fig. 2, there is a horizontal mortise, *b*, through the beam to receive a key or wedge, *c*, to hold the colter in the position shown in said Fig. 1. A difficulty with these underground plows, and a serious one, consists in the trouble of getting the mole up out of the ground, as it cannot be drawn up vertically without great power and danger of breaking it. I obviate this difficulty by the means I employ in securing the colter, and when I desire the mole to be raised out of the ground I simply knock out the key *c*, and the colter will fall back until it assumes the position shown in Fig. 2, and the mole runs out to the surface, and in this position the plow can be run along from place to place on its runners B B.

The mole or ditch-former D, as shown in Figs. 1 and 2, is united to the colter by a link, *d*, which will allow it some play independent of the colter; but I prefer to make and connect the mole as shown in Figs. 3 and 4, where a tongue or nose, E, is let into a vertical slot in the point of the mole, and pivoted in said slot by a pivot-pin at *e*, and the link *d* is fastened to this nose, which may have two or more holes in it for that purpose and for adjustment. By this means of connecting the mole it does not rise and fall as the beam-supports rise and drop in going over the ground, and as a consequence the bottom of the ditch preserves a better level line or plane, as the nose E will yield to the rising or falling of the beam without affecting the mole itself.

In Fig. 4 I have shown a cross-section of the mole D. I find this form of mole passes through the ground with less resistance than any others of which I have knowledge, there being less surface friction on the under side or sole, *f*, the inclined sides *i i* relieving the bottom friction. This makes a good shaped ditch, too, having the regular ditch form below, which is arched over at top. *n* is a guiding-piece at the rear under side of the mole, acting like a rudder to cause the point or foremost end of the mole to follow the colter.

Having thus fully described the nature and object of my invention, what I claim therein as new is—

So hanging a colter to which a mole is attached as that by removing a key or its equivalent that restrains said colter and by advancing the plow said colter and mole will run out of the ground, substantially as herein described and represented.

AUGUSTUS WATSON.

Witnesses:
 THOMAS HEARD,
 JOHN JONES.